United States Patent
Suhail et al.

(10) Patent No.: US 7,929,455 B2
(45) Date of Patent: Apr. 19, 2011

(54) BRIDGE AND METHOD FOR OPTIMIZATION OF MEMORY FOR ETHERNET OAM MULTICAST FRAMES

(75) Inventors: Atiya Suhail, Plano, TX (US); Kamakshi Sridhar, Plano, TX (US); David Elie-Dit-Cosaque, Allen, TX (US); Roberto Guglielmi, Milan (IT)

(73) Assignee: Alcatel Lucent, Paris (FR)

( * ) Notice: Subject to any disclaimer, the term of this patent is extended or adjusted under 35 U.S.C. 154(b) by 441 days.

(21) Appl. No.: 11/776,655

(22) Filed: Jul. 12, 2007

(65) Prior Publication Data
US 2008/0151780 A1  Jun. 26, 2008

Related U.S. Application Data

(60) Provisional application No. 60/870,869, filed on Dec. 20, 2006.

(51) Int. Cl.
*H04L 12/26* (2006.01)
(52) U.S. Cl. .......... 370/252; 370/395.53; 370/401
(58) Field of Classification Search .......... 707/1, 101, 707/205, 6, 100; 370/241.1, 432, 392, 397; 709/224, 228, 220, 242
See application file for complete search history.

(56) References Cited

U.S. PATENT DOCUMENTS

| 5,625,815 | A * | 4/1997 | Maier et al. ............... 707/8 |
| 6,366,917 | B1 * | 4/2002 | St. John Herbert, III ..... 707/100 |
| 7,688,756 | B2 * | 3/2010 | Allan et al. ............... 370/254 |
| 7,843,845 | B2 * | 11/2010 | Sridhar et al. ............. 370/252 |
| 2003/0123460 | A1 * | 7/2003 | Mackiewich et al. ........ 370/401 |
| 2005/0099955 | A1 * | 5/2005 | Mohan et al. ............. 370/242 |
| 2005/0111474 | A1 * | 5/2005 | Kobayashi ................ 370/432 |
| 2005/0267914 | A1 * | 12/2005 | Moore et al. ............. 707/200 |
| 2006/0153220 | A1 * | 7/2006 | Elie-Dit-Cosaque et al. 370/432 |
| 2007/0014290 | A1 * | 1/2007 | Dec et al. ............... 370/390 |
| 2007/0047540 | A1 * | 3/2007 | Bragg et al. ............. 370/386 |
| 2007/0073759 | A1 * | 3/2007 | El-Sabbagh .............. 707/102 |
| 2007/0274321 | A1 * | 11/2007 | Jonsson et al. .......... 370/395.53 |
| 2008/0310417 | A1 * | 12/2008 | Friskney et al. .......... 370/392 |
| 2009/0031413 | A1 * | 1/2009 | Chang et al. ............ 726/13 |

OTHER PUBLICATIONS

Non Patent Literature: Virtual Bridged Local Area Networks IEEE std 802.1q (hereinafter 802.1q), published by IEEE, 1998.*
Non Patent Literature: Review of 802.1ag by Elie-Dit-Cosaque et al. (hereinafter Cosaque), published Mar. 2004.*
Virtual Bridged Local Area Networks IEEE std 802.1q (hereinafter 802.1q), published by IEEE, 1998. See whole document.*
Review of 802.1ag by Elie-Dit-Cosaque et al. (hereinafter Cosaque), published Mar. 2004. See whole document.*
Virtual Bridged Local Area Networks IEEE std 802.1q. Published by IEEE, 1998.*
Review of 802.1ag by Elie-Dit-Cosaque et al. Published Mar. 2004.*
IEEE P802.1ag/D8 "Draft Standard for Local and Metropolitan Area Networks-Virtual Bridged Local Area Networks—Amendment 5: Connectivity Fault Management", Feb. 8, 2007, pp. 1-248.

* cited by examiner

*Primary Examiner* — Michael J Moore, Jr.
(74) *Attorney, Agent, or Firm* — Capitol Patent & Trademark Law Firm, PLLC

(57) ABSTRACT

A bridge (EthOAM device) and method are described herein where the bridge implements the method and reduces a number of static entries (pre-defined multicast MAC addresses) which need to be configured within a database (e.g., forwarding database (FDB)) to support the flow of Ethernet OAM multicast frames such as, for example, Connectivity Check (CC) frames and Link Trace (LT) frames which are used in accordance with the IEEE 802.1ag standard.

15 Claims, 2 Drawing Sheets

BRIDGE AND METHOD FOR OPTIMIZATION OF MEMORY FOR ETHERNET OAM MULTICAST FRAMES

CLAIMING BENEFIT OF PRIOR FILED U.S. APPLICATION

This application claims the benefit of U.S. Provisional Application Ser. No. 60/870,869 filed on Dec. 20, 2006 and entitled "Optimization of Memory for EthOAM Multicast Entries". The contents of this document are hereby incorporated by reference herein.

TECHNICAL FIELD

The present invention is related to a bridge and method for reducing a number of static entries which need to be configured within a database to support the flow of Ethernet OAM multicast frames such as, for example, Connectivity Check (CC) frames and Link Trace (LT) frames which are used in accordance with the IEEE 802.1ag standard.

BACKGROUND

The following abbreviations are herewith defined, at least some of which are referred to in the ensuing description of the prior art and the present invention.
CC Continuity Check
CFM Connectivity Fault Management
DSAP Domain Service Access Point
FDB Forwarding Database
IEEE Institute of Electrical and Electronics Engineers
MA Maintenance Association
MAC Media Access Control
MD Maintenance Domain
MEP Maintenance End Point
MHF MIP Half Function
MIB Management Information Base
MIP Maintenance Intermediate Point
MP Maintenance Point
LT Link Trace
LTR Link Trace Reply
OAM Operation, Administration and Maintenance
PDB Permanent Database
PDU Protocol Data Unit
RAM Random Access Memory
SNMP Small Network Management Protocol
VLAN Virtual Local Area Network Referring to FIG. 1 (PRIOR ART), there is a block diagram of a traditional bridge 100 which implements an IEEE 802.1ag standard that is used to help explain a problem with needing to configure a large number of static entries within a permanent database for pre-defined multicast MAC addresses associated with CC multicast frames and LT multicast frames. The traditional bridge 100 by implementing the IEEE 802.1ag standard is able to provide a connectivity fault management which is useful for detecting, isolating and reporting connectivity faults within Ethernet networks. The IEEE 802.1ag standard is well known to those skilled in the art but to aid in the understanding of the present discussion several of the key terms which are used herein and their definitions are provided below:

CC message: A multicast CFM PDU transmitted periodically by a MEP to assure the continuity over the MA to which the transmitting MEP belongs. No reply is sent by any MP in response to receiving a CCM.

Customer: A consumer of an Ethernet Service. The customer might lease a point to point or multipoint connection to a network provider. The customer is the final user of the Ethernet service.

LT message: A CFM PDU initiated by a MEP to trace a path to a target MAC address, forwarded from MIP to MIP, up to the point at which the LTM reaches its target, a MEP, or can no longer be forwarded. Each MP along the path to the target generates an LTR.

MA: A set of MEPs, each configured with the same MAID and MD Level, established to verify the integrity of a single service instance. An MA can also be thought of as a full mesh of Maintenance Entities among a set of MEPs so configured.

MEP: An actively managed CFM entity, associated with a specific DSAP of a service instance, which can generate and receive CFM PDUs and track any responses. It is an end point of a single MA, and is an endpoint of a separate Maintenance Entity for each of the other MEPs in the same MA.

MIP: A CFM entity consisting of two MHFs. MIPs are not actively monitored and are configured at intermediate points in the Ethernet service instance.

Operator: An operator owns equipment used to create L2 or L3 networks. The operator can lease a subset of its network to providers. The operator (network operator) can, in fact, be identical to, or a part of the same organization as, the service provider, but for purposes of this discussion, the operator and service provider are presumed to be separate organizations.

Provider: A provider does not actually own all its equipment but can manage limited functionalities of its Ethernet services leased to an operator. The provider can also act as a provider if it owns and is willing to lease Ethernet services.

Owner: An owner of a system (and in particular, a Bridge) is a user who has full access to the System Group of the SNMPv2-MIB.

For a more detailed discussion about the IEEE 802.1ag standard, reference is made to the current IEEE 802.1ag/D8 standard entitled "Local and Metropolitan Area Networks-Virtual Bridged Local Area Networks-Amendment 5: Connectivity Fault Management" dated Feb. 8, 2007. The contents of this document are hereby incorporated by reference herein.

The traditional bridge 100 has a processor 102 that supports the flow of multicast frames such as CC and LT multicast frames and terminate the CC and LT multicast frames because it has previously configured pre-defined multicast MAC addresses which correspond to the CC and LT multicast frames at the appropriate level as permanent static entries within a filtering database 104 (FDB 104). The region within the FDB 104 that is occupied by the static entries is called the permanent database 106 (PDB 106). The traditional bridge 100 pursuant to the IEEE 802.1ag standard can support upto 4094 VLANs and eight levels where the eight levels are organized as follows: (1) customers can be assigned levels 7 or 6; (2) providers can be assigned levels 5, 4 and 3; and (3) operators can be assigned levels 2, 1 and 0 (see the aforementioned definitions of the customers, providers and operators).

Plus, the traditional bridge 100 pursuant to the IEEE 802.1ag standard reserves upto eight multicast MAC addresses for CC multicast frames (one for each level) and upto eight multicast MAC addresses for LT multicast frames (one for each level). The eight multicast MAC addresses for the CC multicast frames and the eight multicast MAC addresses for the LT multicast frames are all pre-defined/reserved in the current IEEE 802.1ag standard as follows:

TABLE 1

| 01-80-C2-xx-xx-xy | |
|---|---|
| MD Level of CC message | Four address bits "y" |
| 7 | 7 |
| 6 | 6 |
| 5 | 5 |
| 4 | 4 |
| 3 | 3 |
| 2 | 2 |
| 1 | 1 |
| 0 | 0 |

TABLE 2

| 01-80-C2-xx-xx-xy | |
|---|---|
| MD Level of LT message | Four address bits "y" |
| 7 | F |
| 6 | E |
| 5 | D |
| 4 | C |
| 3 | B |
| 2 | A |
| 1 | 9 |
| 0 | 8 |

In operation, the traditional bridge 100 upon receiving a CC multicast frame or LT multicast frame takes their destination multicast MAC address and performs a table look-up operation in the PDB 106 and if there is a previously stored static entry with the same multicast MAC address then the received CC multicast frame or LT multicast frame is terminated and further processed within the bridge's software (note: the level of the received CC multicast frame or the LT multicast frame is encoded in the last four bits of the multicast MAC address).

However, the traditional bridge 100 by needing to support upto 4094 VLANs and upto eight levels for both CC and LT multicast frames means that the number of static entries that may need to be configured in the PDB 106 so as to store the CC and LT reserved multicast MAC addresses can be as high as (4094×8)×2=655504. Unfortunately, most traditional bridges 100 do not have enough space to support and store such a large number of static entries within their PDB 106. An example is provided next to help illustrate how the traditional bridge 100 needs to configure the static entries within the PDB 106 for both the CC and LT reserved multicast MAC addresses for each supported VLAN. In this example, assume the traditional bridge 100 supports five maintenance associations (MAs) as follows:

| MA1 | VLAN 100 | Level 5 |
|---|---|---|
| MA2 | VLAN 50 | Level 5 |
| MA3 | VLAN 40 | Level 4 |
| MA4 | VLAN 30 | Level 3 |

To configure MA1 which is associated with VLAN 100 at level 5, the traditional bridge 100 (e.g., traditional MEP 100) would create six static entries within the PDB 106 for the reserved CC multicast MAC addresses associated with levels 5 through 0 and also create six static entries within the PDB 106 for the reserved LT multicast MAC addresses associated with levels 5 through 0. These twelve static entries are illustrated as elements 1-12 within TABLE 3.

To configure MA2 which is associated with VLAN 50 at level 5, the traditional bridge 100 (e.g., traditional MEP 100) would create six static entries within the PDB 106 for the reserved CC multicast MAC addresses associated with levels 5 through 0 and also create six static entries within the PDB 106 for the reserved LT multicast MAC addresses associated with levels 5 through 0. These twelve static entries are illustrated as elements 13-24 within TABLE 3.

To configure MA3 which is associated with VLAN 40 at level 4, the traditional bridge 100 (e.g., traditional MEP 100) would create five static entries within the PDB 106 for the reserved CC multicast MAC addresses associated with levels 4 through 0 and also create five static entries within the PDB 106 for the reserved LT multicast MAC addresses associated with levels 4 through 0. These ten static entries are illustrated as elements 25-34 within TABLE 3.

To configure MA4 which is associated with VLAN 30 at level 3, the traditional bridge 100 (e.g., traditional MEP 100) would create four static entries within the PDB 106 for the reserved CC multicast MAC addresses associated with levels 3 through 0 and also create four static entries within the PDB 106 for the reserved LT multicast MAC addresses associated with levels 3 through 0. These eight static entries are illustrated as elements 35-52 within TABLE 3.

TABLE 3

| Static Entry | Vlan ID | Multicast MAC Address |
|---|---|---|
| 1 | 100 | CC 5 |
| 2 | 100 | CC 4 |
| 3 | 100 | CC 3 |
| 4 | 100 | CC 2 |
| 5 | 100 | CC 1 |
| 6 | 100 | CC 0 |
| 7 | 100 | LT 5 |
| 8 | 100 | LT 4 |
| 9 | 100 | LT 3 |
| 10 | 100 | LT 2 |
| 11 | 100 | LT 1 |
| 12 | 100 | LT 0 |
| 13 | 50 | CC 5 |
| 14 | 50 | CC 4 |
| 15 | 50 | CC 3 |
| 16 | 50 | CC 2 |
| 17 | 50 | CC 1 |
| 18 | 50 | CC 0 |
| 19 | 50 | LT 5 |
| 20 | 50 | LT 4 |
| 21 | 50 | LT 3 |
| 22 | 50 | LT 2 |
| 23 | 50 | LT 1 |
| 24 | 50 | LT 0 |
| 25 | 40 | CC 4 |
| 26 | 40 | CC 3 |
| 27 | 40 | CC 2 |
| 28 | 40 | CC 1 |
| 29 | 40 | CC 0 |
| 30 | 40 | LT 4 |
| 31 | 40 | LT 3 |
| 32 | 40 | LT 2 |
| 33 | 40 | LT 1 |
| 34 | 40 | LT 0 |
| 35 | 30 | CC 3 |
| 36 | 30 | CC 2 |
| 37 | 30 | CC 1 |
| 38 | 30 | CC 0 |
| 39 | 30 | LT 3 |
| 40 | 30 | LT 2 |
| 41 | 30 | LT 1 |
| 42 | 30 | LT 0 |

Note:
CCx: Reserved multicast MAC address for CC for level x.
LTx: Reserved multicast MAC address for LT for level x.

Accordingly, there has been and is a need to provide a solution which can be implemented by a bridge to reduce the number of static entries that need to be configured in the PDB 106 while still being able to support 4094 VLANs and 8 Levels. This need and other needs are satisfied by the present invention.

SUMMARY

In one aspect, the present invention provides a method for reducing a number of static entries which need to be configured within a database of a bridge. The method includes the steps of: (1) forming one or more VLAN sets where each VLAN set contains one or more VLAN(s) that are configured at a same level; (2) creating a list of supported levels; (3) configuring a static entry within the database for each reserved multicast address for a lowest supported level and all lesser levels through zero which correspond with the VLAN(s) in the VLAN set at the lowest supported level; (4) removing a current lowest supported level from the list of supported levels; (5) configuring a static entry within the database for each reserved multicast address for the current lowest supported level through a highest level so far configured plus one which correspond with the VLAN(s) in the VLAN set at the current lowest supported level; and (6) repeating the removing step (4) and the second configuring step (5) until the list of supported levels is empty.

In yet another aspect, the present invention provides a bridge (e.g., EthOAM entity) with a processor and memory with instructions stored therein which are processable by the processor to reduce a number of static entries that need to be stored within a database by: (1) forming one or more VLAN sets where each VLAN set contains one or more VLAN(s) that are configured at a same level; (2) creating a list of supported levels; (3) configuring a static entry within the database for each reserved multicast address for a lowest supported level and all lesser levels through zero which correspond with the VLAN(s) in the VLAN set at the lowest supported level; (4) removing a current lowest supported level from the list of supported levels; (5) configuring a static entry within the database for each reserved multicast address for the current lowest supported level through a highest level so far configured plus one which correspond with the VLAN(s) in the VLAN set at the current lowest supported level; and (6) repeating the removing step (4) and the second configuring step (5) until the list of supported levels is empty.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings wherein.

DETAILED DESCRIPTION

Figure 1:
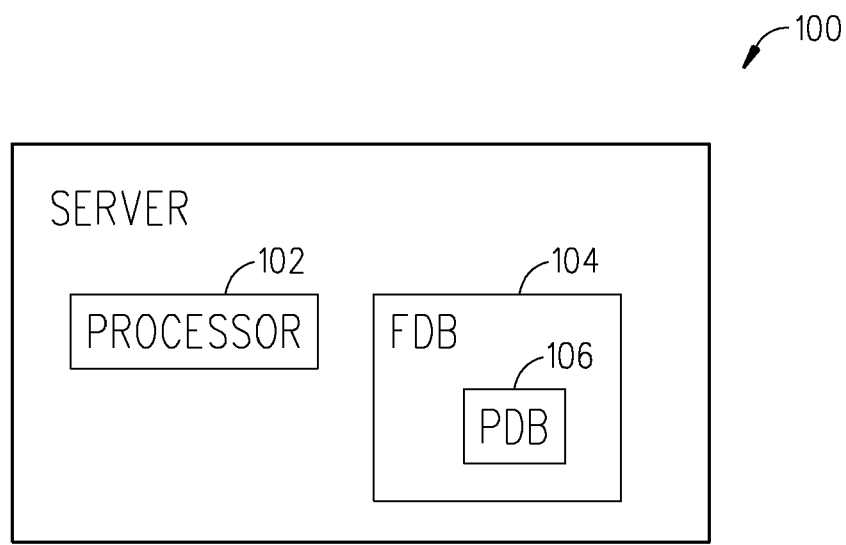
FIG. 1 (PRIOR ART) is a block diagram illustrating the basic components of a traditional bridge which is used to help explain a problem with needing to configure a large number of static entries within a database that is addressed by the present invention.
Figure 2:
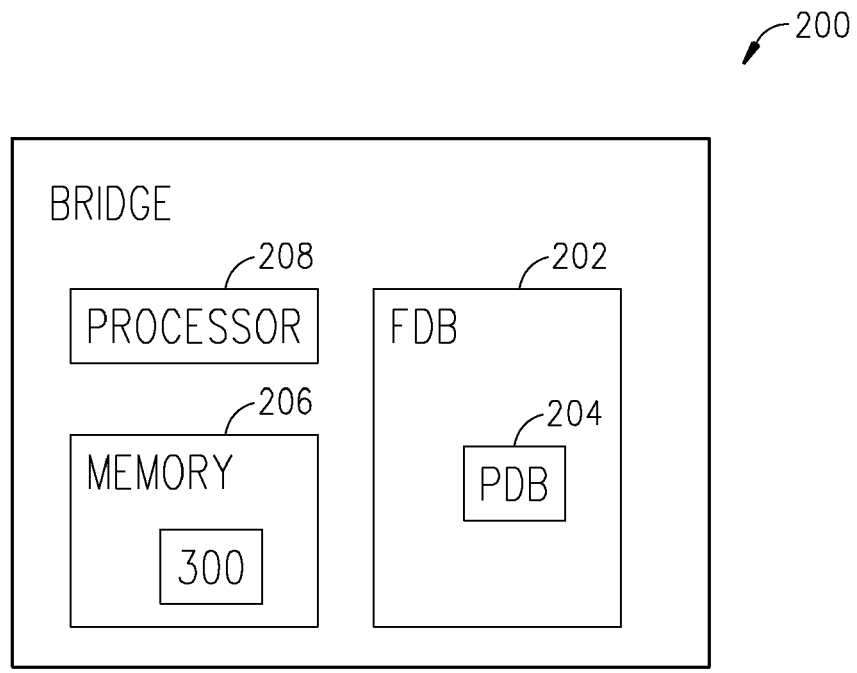
FIG. 2 is a block diagram illustrating the basic components of a bridge which has been configured to reduce the number of static entries that need to be configured within a database in accordance with the present invention.
Figure 3:
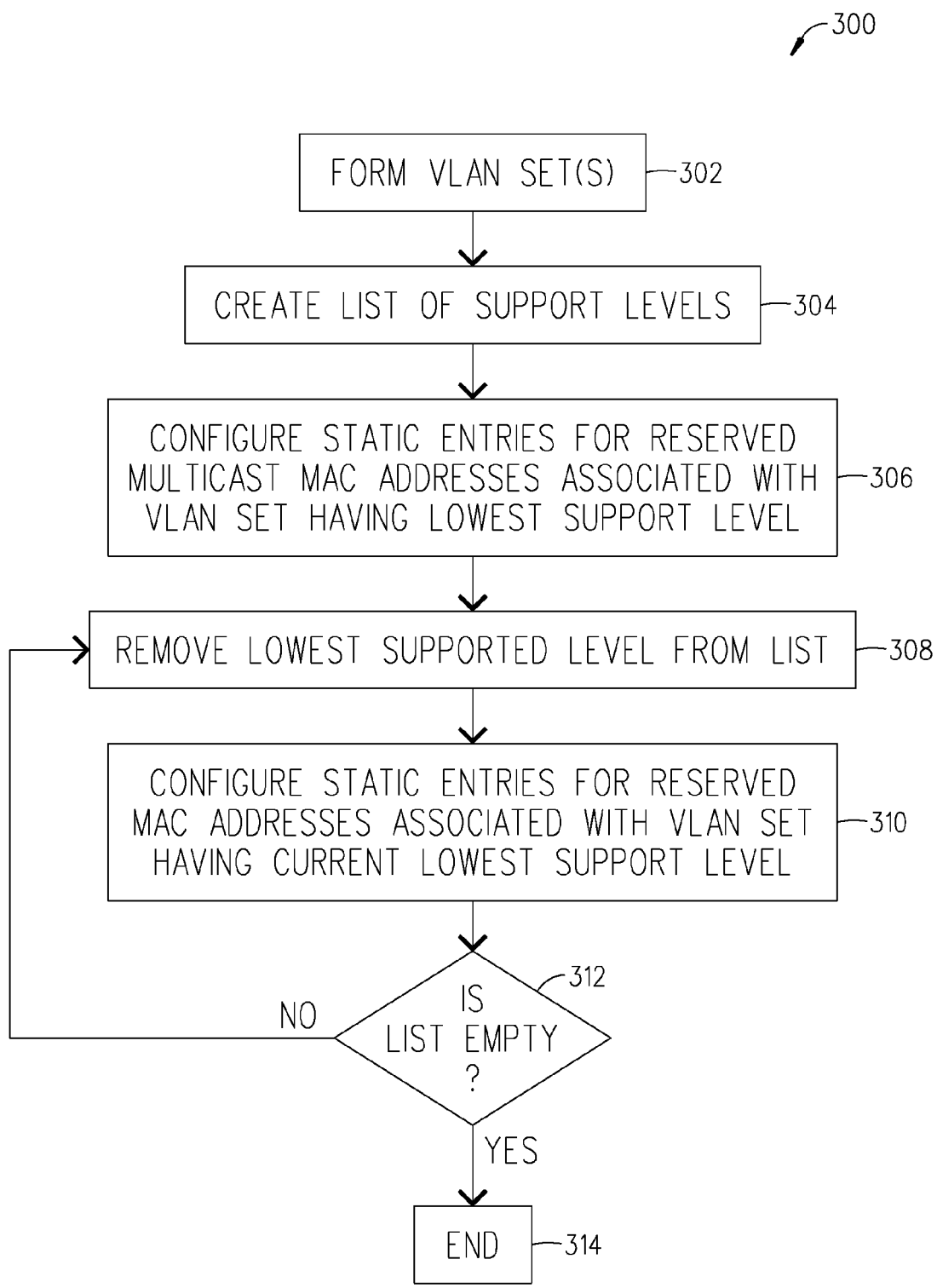
FIG. 3 is a flowchart illustrating the basic steps of a method for reducing the number of static entries that need to be configured within the database of a bridge in accordance with the present invention.

Referring to FIGS. 2 and 3, there are respectively shown a block diagram of a bridge 200 and a flowchart of a method 300 that is implemented by the bridge 200 to reduce the number of static entries which need to be configured in a FDB 202 (in particular a PDB 204) in accordance with the present invention. In particular, the bridge 200 has a memory 206 (e.g., RAM memory 206) which stores instructions that are processable by a processor 208 to facilitate the various steps of the memory optimization method 300 as follows:

Step 1: Form one or more VLAN sets (e.g., Vx, Vy, Vz) where each VLAN set contains one or more VLAN(s) that are configured at a same level (see step 302 in FIG. 3). In particular, the VLANs that are at the same level can be grouped into a VLAN set as follows:

$Vx=\{Vx1, Vx2, \ldots, Vxn\}$ where Vx=VLANs configured for level x $Vy=\{Vy1, Vy2, \ldots, Vyn\}$ where Vy=VLANs configured for level y $Vz=\{Vz1, Vz2, \ldots, Vzn\}$ where Vz=VLANs configured for level z where $x>y>z$.

Step 2: Create a list of the levels supported by the bridge 200 and find the smallest level in this list (z) (see step 304 in FIG. 3).

Step 3: Configure a static entry within the PDB 204 for each pre-defined/reserved CC and LT multicast MAC address for the lowest supported level (z) and all lesser levels through zero which correspond with the VLAN(s) in the VLAN set at the lowest level (z) (see step 306 in FIG. 3).

Step 4: Remove the current lowest level from the list of supported levels (see step 308 in FIG. 3).

Step 5: Configure a static entry within the PDB 204 for each pre-defined/reserved CC and LT multicast MAC address at the current lowest supported level through a highest level so far configured plus one which correspond with the VLAN(s) in the VLAN set at the current lowest supported level (see step 310 in FIG. 3).

Step 6. Repeat Steps 4 and 5 until the list of supported levels is empty (see steps 312 and 314 in FIG. 3).

A graphical result of this optimization is shown below in TABLE 4.

TABLE 4

| VLAN set | MAC Addresses to be Configured | Number of Multicast Entries |
|---|---|---|
| {Vx, VY, Vz} | CCz, CCz − 1, . . . , CC0<br>LTz, LTz − 1, . . . , LT0 | 2 (z + 1) |
| {Vx, Vy} | CCy, CCy − 1 . . . CCy − (y − z − 1)<br>LTy, LTy − 1 . . . LTy − (y − z − 1) | 2 (y − z) |
| {Vx} | CCx, CCx − 1, . . . , CCx − (x − y − 1)<br>LTx, LTx − 1, . . . , LTx − (x − y − 1) | 2 (x − y) |

This table should be read as follows: For the first row, these MAC addresses (CCz, CCz−1, . . . , CC0 and LTz, LTz−1, . .

., LT0) need to be configured in PDB 204 for VLAN set {Vx, Vy, Vz}. In the second row, these MAC addresses (CCy, CCy-1, . . . , CCy-(y-Z-1) and LTy, LTy-1, . . . , LTy-(y-Z-1)) need to be configured in PDB 204 for VLAN set {Vx, Vy}. In the third row, these MAC addresses (CCx, CCx-1, . . . , CCx-(x-y-1) and LTx, LTx-1, . . . , LTx-(x-y-1)) need to be configured in PDB 204 for VLAN set {Vx}.

As can be seen, the present invention is a marked improvement over the prior art since the total number of static entries that need to be configured in memory with optimization=2(z+1+y-z+x-y)=2x+2. While, the total number of static entries that need to be configured in memory without optimization=[(2*#of VLANs at level z*(z+1))+(2*#of VLANs at level y*(y+1))+(2*#of VLANs at level z*(x+1))]. This savings is illustrated below by using the same example that was discussed above with respect to the prior art but now the memory optimization method 300 of the present invention is used to configure the static entries in the PDB 204 of the bridge 200.

In this example, assume the bridge 200 supports five maintenance associations (MAs) as follows:

| | | |
|---|---|---|
| MA1 | VLAN 100 | Level 5 |
| MA2 | VLAN 50 | Level 5 |
| MA3 | VLAN 40 | Level 4 |
| MA4 | VLAN 30 | Level 3 |

Step 1: Group the VLANs that are at the same level as follows:
V5={VLAN100, VLAN50}
V4={VLAN40}
V3={VLAN30}
where Vx: is the Vlan at level x (see step 302 in FIG. 3).
Step 2: Create a list of the supported levels {5,4,3} and find the smallest level {3} in this list (see step 304 in FIG. 3).
Step 3: Configure a static entry within the PDB 204 for each pre-defined/reserved CC and LT multicast MAC address for the lowest supported level {3} and all lesser levels through zero which correspond with the VLAN(s) in the VLAN set V3 (note: the eight configured static entries are illustrated as elements 1-8 in TABLE 4) (see step 306 in FIG. 3).
Step 4: Remove the current lowest level {3} from the list of supported levels. Thus, the smallest level now in the list is level {4} (see step 308 in FIG. 3).
Step 5: Configure a static entry within the PDB 204 for each pre-defined/reserved CC and LT multicast MAC address at the current lowest supported level {4} through a highest level so far configured plus one {3+1} which correspond with the VLAN(s) in the VLAN set V4 (note: the two configured static entries are illustrated as elements 9-10 in TABLE 4) (see step 310 in FIG. 3).
Step 6A (repeat step 4): Remove the current lowest level {4} from the list of supported levels. Thus, the smallest level now in the list is level {5} (see step 312 and step 308 (second time) in FIG. 3).
Step 6B (repeat step 5): Configure a static entry within the PDB 204 for each pre-defined/reserved CC and LT multicast MAC address at the current lowest supported level {5} through a highest level so far configured plus one {4+1} which correspond with the VLAN(s) in the VLAN set V5 (note: the two configured static entries are illustrated as elements 11-12 in TABLE 4) (see step 310 (second time) in FIG. 3).
Step 7: The memory optimization method 300 is stopped since the list of levels is now empty (see step 314 in FIG. 3).

The results of performing steps 1-7 for this particular example are illustrated in TABLES 5 and 6:

TABLE 5

| Static Entry | VLAN Set | Multicast MAC Address |
|---|---|---|
| 1 | {100, 50, 40, 30} | CC 3 |
| 2 | {100, 50, 40, 30} | CC 2 |
| 3 | {100, 50, 40, 30} | CC 1 |
| 4 | {100, 50, 40, 30} | CC 0 |
| 5 | {100, 50, 40, 30} | LT 3 |
| 6 | {100, 50, 40, 30} | LT 2 |
| 7 | {100, 50, 40, 30} | LT 1 |
| 8 | {100, 50, 40, 30} | LT 0 |
| 9 | {100, 50, 40} | CC 4 |
| 10 | {100, 50, 40} | LT 4 |
| 11 | {100, 50} | CC 5 |
| 12 | {100, 50} | LT 5 |

TABLE 6

| VLAN set | MAC Addresses to be Configured | Number of multicast entries |
|---|---|---|
| (V5, V4, V3) | CC3, CC2, CC1, CC0 LT3, LT2, LT1, LT0 | 8 |
| (V5, V4) | CC4, LT4 | 2 |
| (V5) | CC5, LT5 | 2 |

As can be seen in TABLES 5 and 6, the total number of static entries configured in the PDB 204 is 12 (elements 1-12). In contrast, in the prior art example 42 static entries had to be configured in the PDB 106 as shown in TABLE 3. Thus, the number of configured static entries has been reduced by 42-12=30. In this particular example, this results in memory savings of 75%.

From the foregoing, it can be readily appreciated by those skilled in the art that the present invention provides a memory optimization method 300 that reduces the amount of memory needed to store the static entries that are associated with EthOAM by: (1) identifying groups of VLANs that are at the same level; and (2) storing them all in one entry as follows: <VLAN x, VLAN y, VLAN p, reserved MAC address G>. This is done for every group of VLAN, starting from the lowest level. In contrast, in the prior art a separate entry needed to be stored for each VLAN as follows: <VLAN x, MAC G>, <VLAN y, MAC G>, <VLAN p, MAC G>. The memory optimization method 300 can be implemented in any bridge 200 that has a microprocessor RAM which can store entries in the format <VLANx, VLANy, VLANZ, MAC>. Thus, the bridge 200 after configuring the static entries in the PDB 204 can receive an incoming frame and perform the following operations: (1) determine the VLAN (there is no need to know the level); (2) look-up the PDB 204 and check if the destination MAC address in the incoming frame matches any of the stored multicast MAC destination addresses; and (3) if there is a match then terminate the incoming frame.

Although one embodiment of the present invention has been illustrated in the accompanying Drawings and described in the foregoing Detailed Description, it should be understood that the invention is not limited to the embodiment disclosed, but is capable of numerous rearrangements, modifications and substitutions without departing from the spirit of the invention as set forth and defined by the following claims.

The invention claimed is:
1. A method for reducing a number of static entries within a database of a bridge, said method comprising the steps of:

forming one or more Virtual Local Area Network (VLAN) sets in the bridge where each VLAN set contains one or more VLAN(s) that are configured at a same level;

creating a list of supported levels in the bridge;

configuring said database of the bridge with a static entry corresponding to a reserved multicast address for a lowest supported level and all lesser levels through zero which correspond with the VLAN(s) in the VLAN set at the lowest supported level;

removing a current lowest supported level from the list of supported levels;

configuring said database of the bridge with a static entry corresponding to a reserved multicast address for the current lowest supported level through a highest level so far configured plus one which correspond with the VLAN(s) in the VLAN set at the current lowest supported level; and repeating said removing step and said second configuring step until the list of supported levels is empty.

2. The method of claim 1, wherein said database is a permanent database in a filtering database.

3. The method of claim 1, wherein said reserved multicast address is associated with a Connectivity Check multicast address.

4. The method of claim 1, wherein said reserved multicast address is associated with a Link Trace multicast address.

5. The method of claim 1, wherein said bridge is a Maintenance End Point (MEP) that supports a connectivity fault management protocol which includes Connectivity Check multicast frames and Link Trace multicast frames.

6. The method of claim 1, wherein said bridge is a Maintenance Intermediate Point (MIP) that supports a connectivity fault management protocol which includes Connectivity Check multicast frames and Link Trace multicast frames.

7. The method of claim 1, wherein said bridge supports an IEEE P802.1ag protocol.

8. A bridge, comprising:
a processor;
a memory; and
instructions which are accessible from said memory and processable by said processor to reduce a number of static entries that need to be stored within a database of the bridge by:
   forming one or more Virtual Local Area Network (VLAN) sets where each VLAN set contains one or more VLAN(s) that are configured at a same level;
   creating a list of supported levels;
   configuring said database with a static entry corresponding to a reserved multicast address for a lowest supported level and all lesser levels through zero which correspond with the VLAN(s) in the VLAN set at the lowest supported level;
   removing a current lowest supported level from the list of supported levels;
   configuring said database with a static entry corresponding to a reserved multicast address for the current lowest supported level through a highest level so far configured plus one which correspond with the VLAN(s) in the VLAN set at the current lowest supported level; and
   repeating said removing step and said second configuring step until the list of supported levels is empty.

9. The bridge of claim 8, wherein said database is a permanent database in a filtering database.

10. The bridge of claim 8, wherein said reserved multicast address is associated with a Connectivity Check multicast address.

11. The bridge of claim 8, wherein said reserved multicast address is associated with a Link Trace multicast address.

12. The bridge of claim 8, wherein said processor supports a connectivity fault management protocol which includes Connectivity Check multicast frames and Link Trace multicast frames.

13. The bridge of claim 8, wherein said processor supports an IEEE P802.1ag protocol.

14. An Ethernet Operation, Administration and Maintenance (OAM) device, comprising:
a processor which supports a connectivity fault management protocol;
a memory; and
instructions which are accessible from said memory and processable by said processor to reduce a number of static entries within a permanent database of the device by:
   forming one or more Virtual Local Area Network (VLAN) sets where each VLAN set contains one or more VLAN(s) that are configured at a same level;
   creating a list of supported levels;
   configuring said database with a static entry corresponding to a reserved multicast MAC address including a Connectivity Check multicast address and a Link Trace multicast address at a lowest supported level and all lesser levels through zero which correspond with the VLAN(s) in the VLAN set at the lowest supported level;
   removing a current lowest supported level from the list of supported levels;
   configuring said database with a static entry corresponding to a reserved multicast address including a Connectivity Check multicast address and a Link Trace multicast address for the current lowest supported level through a highest level so far configured plus one which correspond with the VLAN(s) in the VLAN set at the current lowest supported level; and
   repeating said removing step and said second configuring step until the list of supported levels is empty.

15. The Ethernet OAM device of claim 14, wherein said connectivity fault management protocol is associated with an IEEE P802.1ag protocol.

\* \* \* \* \*